May 10, 1932.  E. K. COLE  1,857,436

CABLE SPLICE

Filed Nov. 3, 1930

Inventor
Elmer K. Cole
by Orwig + Hague Attys

Patented May 10, 1932

1,857,436

UNITED STATES PATENT OFFICE

ELMER K. COLE, OF WINTERSET, IOWA

CABLE SPLICE

Application filed November 3, 1930. Serial No. 493,019.

The object of my invention is to provide a cable splice of simple, durable and inexpensive construction, especially designed for use in connection with cables of the kind in which there is employed a series of wires arranged spirally in cylindrical form, and an outer series of wires arranged spirally in an opposite direction; and also to provide a splice for cables of this character in which substantially every wire of the cable is firmly anchored and secured to the splice socket.

My invention consists in the construction, arrangement and combination of the various parts of the device, whereby the objects contemplated are attained, as hereinafter more fully set forth, pointed out in my claims, and illustrated in the accompanying drawings, in which:

Figure 1:
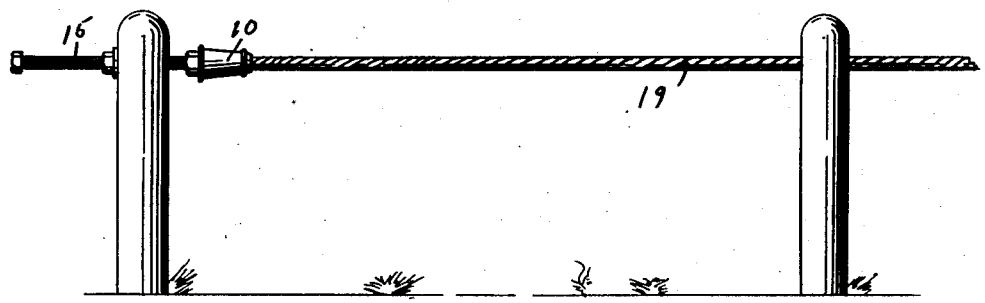
Figure 1 shows a side elevation of a cable having my improved splice applied thereto.

Referring to the accompanying drawings, I have used the reference numeral 10 to indicate generally the splice socket. The socket is formed hollow and the interior is tapered toward the receiving end into which the cable is to be inserted. At the opposite end there is a screw threaded opening 11, the diameter of which is almost as large as the diameter of the adjacent portion of the socket.

The wedge is indicated generally by the numeral 12. Its interior is cylindrical and its exterior is tapered toward the end which is inserted in the cable. The wedge is divided longitudinally by a slot 13, which slot is preferably of irregular outline to prevent a wire of the cable from entering the slot. The interior of the socket is formed with spiral grooves 14 arranged so they will receive the spiral wires of an inner layer of wires of a cable. A screw threaded rod 15 is provided and designed to enter the screw threaded opening 11 in the socket.

Figure 6:
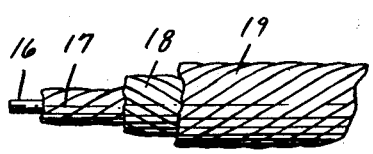
Figure 6 shows a side elevation of a cable of the kind employed with my improved splice device.

The form of cable with which my improvement is especially designed to operate may comprise a straight central wire 16, a single layer of wires 17 wrapped spirally around the wire 16, a second single layer of wires 18 wrapped spirally around the wires 17 in an opposite direction, and an outer series of wires 19 wrapped around the wires 18 spirally in an opposite direction, as illustrated in Figure 6.

In practical use the end of a cable is inserted in the socket until the wire engages a shoulder between the interior of the socket and the screw threaded opening 11. Then the wedge 12 is inserted through the screw threaded opening, with its sharp edge between the layers of wires 18 and 19. Then the wedge is driven into the cable, and while being thus driven the strands of wire 18 will then accurately enter the respective grooves 14 on the interior of the wedge, and the wires and grooves will thereby form screw threads so that the wedge will be partly rotated during its entering movement.

Due to the fact that the outer surface of the wedge is smooth, the wedge can readily rotate inside of the layer of wires 19 which are spirally arranged in an opposite direction.

Figure 2:
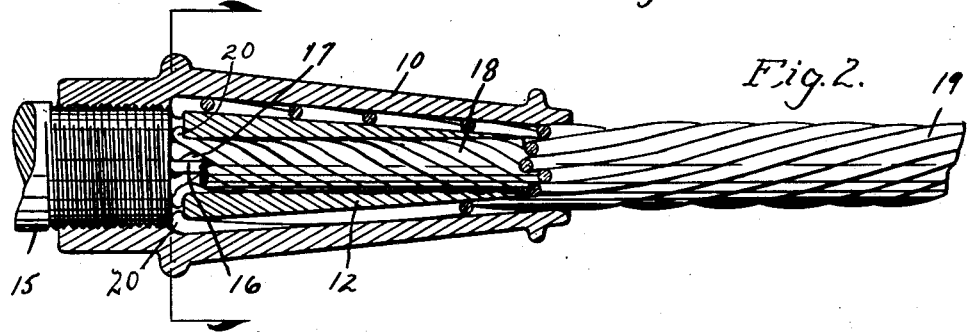
Figure 2 shows a central longitudinal sectional view of a cable splice embodying my invention with a cable firmly anchored therein.
Figure 3:
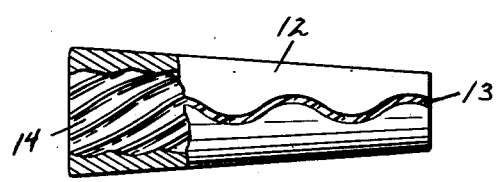
Figure 3 shows a side elevation partly in section illustrating the wedge.
Figure 4:
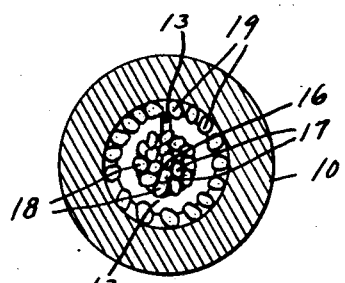
Figure 4 shows a sectional view on the line 4—4 of Figure 2.
Figure 5:
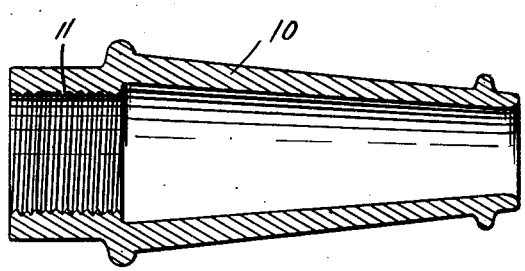
Figure 5 shows a longitudinal sectional view of the socket device.

When the wedge has been driven into the cable with its thick end a slight distance within the end of the cable, then the screw 15 is inserted and when this screw engages the ends of the wires that are held apart by the thick end of the wedge, the forceful pressure applied to the screw threaded rod 15 will cause the projecting ends of the wires to bend over the thick end of the wedge, as indicated at 20 in Figure 2, so that by this means practically every wire in the cable is securely anchored within the socket, and when strains are applied to the cable, such strains will be distributed substantally uniformly throughout every strand of the cable.

In practice with my improved splice I have demonstrated that when strains are applied to the cable tending to pull it way from the socket to an extent approaching the breaking point, the amount of creep of the cable within the socket is reduced to a minimum and if breakage occurs it is within the socket itself or the cable, one or the other of which will give away before the cable is drawn from the socket.

I claim as my invention:

1. A cable splice for wire cables of the class having a central strand of wires spirally arranged and an outer layer of wires spirally wound in an opposite direction, said splice comprising a socket conical in shape and having its interior tapered toward the end in which the cable is to be inserted, and a conical hollow wedge having its interior substantially cylindrical and formed with spiral grooves to receive the wires of the central strand and to impart a rotary movement to the wedge when being forced into the cable, said wedge having its outer surface tapered to force the outer strands of the cable against the interior of the socket.

2. A cable splice for wire cables of the class having a central strand of wires spirally arranged and an outer layer of wires spirally wound in an opposite direction, said splice comprising a socket conical in shape and having its interior tapered toward the end in which the cable is to be inserted, and a hollow conical wedge having its interior substantially cylindrical and formed wth spiral grooves to receive the wires of the central strand and to impart a rotary movement to the wedge when being forced into the cable, said wedge having its outer surface tapered to force the outer strands of the cable against the interior of the socket, said outer surface of the wedge being smooth to permit free rotation relative to said outer strands of the cable.

3. A cable splice for wire cables of the class having a central strand of wires spirally arranged and an outer layer of wires spirally wound in an opposite direction, said splice comprising a socket conical in shape and having its interior tapered toward the end in which the cable is to be inserted, and a hollow conical wedge having its interior substantially cylindrical and formed with spiral grooves to receive the wires of the central strand and to impart a rotary movement to the wedge when being forced into the cable, said wedge having its outer surface tapered to force the outer strands of the cable against the interior of the socket, said wedge being split longitudinally at one side.

4. A cable splice for wire cables of the class having a central strand of wires spirally arranged and an outer layer of wires spirally wound in an opposite direction, said splice comprising a socket conical in shape and having its interior tapered toward the end in which the cable is to be inserted, and a hollow conical wedge having its interior substantially cylindrical and formed with spiral grooves to receive the wires of the central strand and to impart a rotary movement to the wedge when being forced into the cable, said wedge having its outer surface tapered to force the outer strands of the cable against the interior of the socket, said wedge being split longitudinally at one side along an irregular line to prevent an outer cable strand from entering the space between the edges of the split portion.

Des Moines, Iowa, Sept. 25, 1930.

ELMER K. COLE.